W. C. FURRY.
CENTERING FRAME FOR ARCH CONSTRUCTIONS.
APPLICATION FILED JUNE 19, 1916.
Reissued Mar. 12, 1918. 14,444.
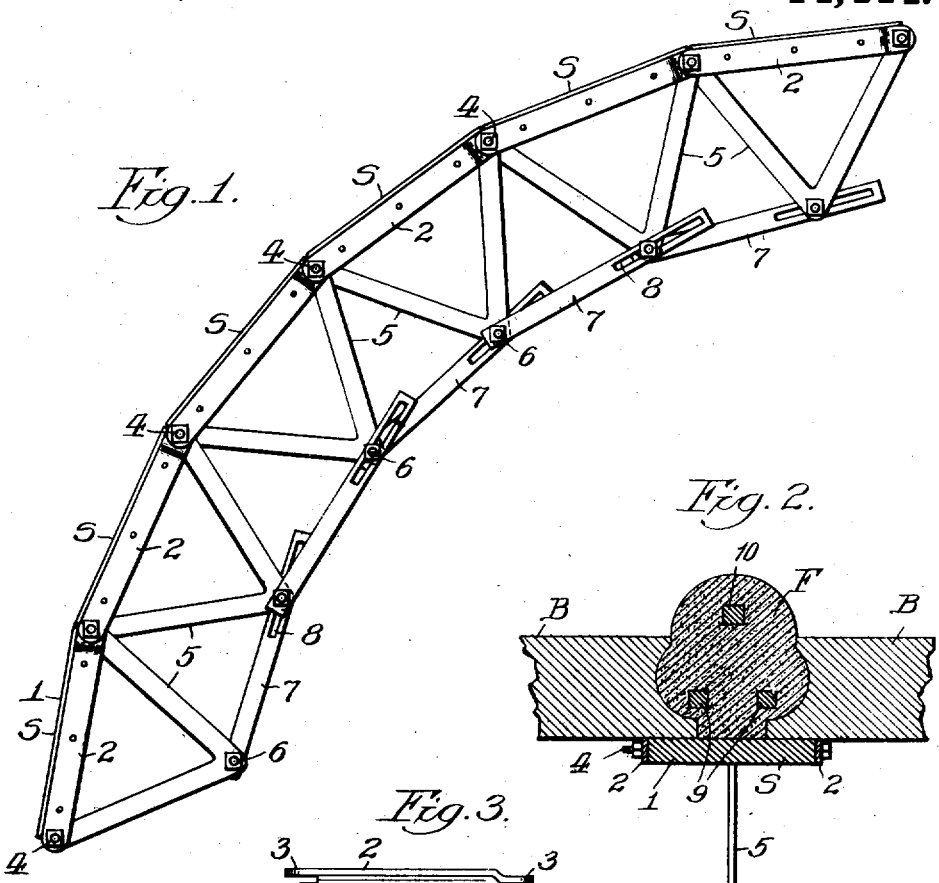
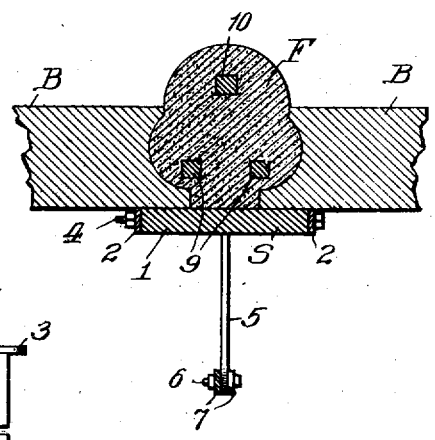
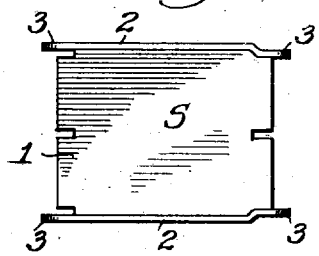
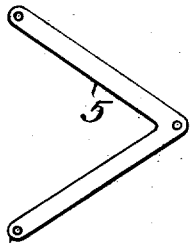
Fig. 4.
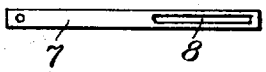
Witness:
John Enders
Inventor:
William C. Furry,
by Wallace R. Lane
Atty.
BACKETT & WILHELMS CORP. N.Y.

UNITED STATES PATENT OFFICE.

WILLIAM C. FURRY, OF SHAWNEE, OKLAHOMA, ASSIGNOR, BY MESNE ASSIGNMENTS, TO AMERICAN CONCRETE FORMS COMPANY, OF BLOOMINGTON, ILLINOIS, A CORPORATION OF ILLINOIS.

CENTERING-FRAME FOR ARCH CONSTRUCTIONS.

14,444. Specification of Reissued Letters Patent. Reissued Mar. 12, 1918.

Original No. 1,174,931, dated March 7, 1916, Serial No. 34,260, filed June 15, 1915. Application for reissue filed June 19, 1916. Serial No. 104,615.

*To all whom it may concern:*

Be it known that I, WILLIAM C. FURRY, a citizen of the United States, residing at Shawnee, county of Pottawatomie, and State of Oklahoma, have invented a new and useful Centering-Frame for Arch Constructions, of which the following is a specification.

This invention relates to improvements in centering frames for arch constructions and it is an object of my invention to provide a device of this general character having novelty and improvements whereby the center may be readily adjusted to any radius, as the requirements of practice may necessitate.

A further object of my invention is to provide a novel and improved centering frame consisting of a plurality of retaining sections detachably and pivotally connected one with another and having means whereby the sections may be effectively locked against pivotal movement.

It is a further object of my invention to provide a device of this class in which the retaining sections support and form a smooth under-surface for the concrete structure poured thereon.

The invention consists in the details of construction and in the combination and arrangement of the several parts of my improved centering frame, whereby certain important advantages are attained and a device rendered simple, inexpensive and otherwise more convenient and advantageous for use.

In the accompanying drawings Figure 1 is a view in elevation of a portion of a centering frame embodying one form of my invention.

Fig. 2 is an enlarged fragmentary transverse sectional view of the same, showing it in use.

Fig. 3 is a view in top plan of one of the retaining sections showing the hinge plates attached.

Fig. 4 is an elevational view of one of the braces, and

Fig. 5 is an elevational view of one of the adjusting members.

My improved centering frame as herein disclosed, comprises a predetermined number of retaining sections S, having a central recess in each end thereof (see Fig. 3) and detachably and pivotally connected one with another, which sections consist of retaining sections 1 having secured to their opposite longitudinal edges the hinge bars 2, which bars extend beyond the opposite ends of the sections 1. The adjacent extended portions 3 of said bars are connected together by the pintles 4, which also project through the extremities of adjacent braces 5, substantially V-shaped in form. By this arrangement it will be readily perceived that a pivotal connection between adjacent retaining sections may be effected with convenience and facility. The apex portion of each of the braces 5 has disposed therethrough the clamping bolt 6, which is also disposed through one extremity of an adjusting member 7, and through a longitudinally disposed elongated slot 8 produced in the extremity of a second adjusting member, said adjusting members being arranged at opposite sides of the braces 5. By loosening the bolt 6 the various retaining sections may be adjusted about their pivots until the desired relative adjustment is attained, whereupon said clamping bolts are tightened so that the adjusting member 7 will effectively maintain said retaining sections 1 in their relative adjustment. The retaining sections may be adjusted to any position from a straight line to a complete arc.

My improved centering frame, as herein embodied, is particularly designed for use in connection with concrete arches formed of pre-cast blocks and concrete as shown in Fig. 2, and the retaining sections 1 are not only adapted to support the blocks or slabs B which form a part of the arch, but they also retain and form the under-surface for the concrete filling between the blocks. By the use of the retaining sections 1, as disclosed in the present application, I find that the ends of the blocks or slabs B can be conveniently spaced apart a distance sufficient to embed within the concrete filling F for joining adjacent ends of the slabs or blocks B, to intrados reinforcing rods 9 and one extrados rod 10, or the number of these rods may be increased if practice so requires.

In the foregoing description it is thought to be obvious that a centering frame constructed in accordance with my invention is of an extremely simple and comparatively inexpensive nature, and is particularly well adapted for use by reason of the convenience and facility with which it may be assembled and it will also be obvious that my invention is susceptible of changes and modifications without departing from the principles thereof. For this reason I do not wish to be understood as limiting myself to the arrangement and formation of the several parts herein shown in carrying out my invention and practice.

I claim:

1. A centering frame for arch construction comprising a plurality of retaining sections, bars secured to the longitudinal side edges of said sections and projecting beyond the ends thereof, pintles disposed through the extended ends of the bars, a V-shaped brace, the pintles being disposed through the extremities of said brace, a clamping member carried by the apex portion of each of the braces, and an adjusting member pivotally supported by each of the clamping members, said adjusting member being provided with an elongated longitudinally disposed slot through which the clamping member of an adjacent brace is adapted to pass.

2. In a centering for arch constructions formed of plastic material, the combination of a plurality of retaining sections, bars secured to the longitudinal side edges of said sections and projecting beyond the ends thereof, a V-shaped brace, pintles disposed through the extended ends of said bars and the extremities of said brace for pivotally connecting the parts in operative relation, a clamping member carried by the apex portion of each of said braces and an adjusting member pivotally supported by each of said clamping members.

3. In a centering for arch constructions formed of plastic material, the combination of a plurality of retaining sections, bars secured to the longitudinal side edges of said sections and projecting beyond the ends thereof, a V-shaped brace, pintles disposed through the extended ends of said bars and the extremities of said brace for pivotally connecting the parts in operative relation, and readily adjustable means connecting with the V-shaped brace and adapted to maintain said sections in a plane or arc as desired.

4. A rib centering for culverts, comprising a series of connected mold sections adapted to form a mold for the rib only, and to support one end of a plurality of transverse slabs or the like, and means for adjusting the span and rise of said centering for the purpose set forth.

5. A rib centering for culverts, comprising a series of connected mold sections adapted to form a mold for the rib only, and to support on either side of said rib, one end of a plurality of transverse slabs or the like, and means to adjust the span and rise of said centering for the purpose set forth.

6. A rib centering for culverts, comprising a series of mold sections adapted to retain plastic material directly thereon, and to form a mold for the rib only, and designed to support on either side thereof one end of a plurality of transverse slabs, and means for pivotally connecting said mold sections one with another for the purpose set forth.

In witness whereof, I hereunto subscribe my name to this specification in the presence of two witnesses.

WILLIAM C. FURRY.

Witnesses:
J. D. LYDICK,
WM. M. BELT.

Copies of this patent may be obtained for five cents each, by addressing the "Commissioner of Patents, Washington, D. C."